(12) United States Patent
Ishikawa

(10) Patent No.: US 7,468,523 B2
(45) Date of Patent: Dec. 23, 2008

(54) RAINDROP DETECTION APPARATUS HAVING LENS UNIT LARGER THAN RADIUS OF REFLECTED LIGHT

(75) Inventor: Junichi Ishikawa, Kariya (JP)

(73) Assignee: Denso Corporation (JP)

( * ) Notice: Subject to any disclaimer, the term of this patent is extended or adjusted under 35 U.S.C. 154(b) by 115 days.

(21) Appl. No.: 11/231,866

(22) Filed: Sep. 22, 2005

(65) Prior Publication Data

US 2006/0076477 A1 Apr. 13, 2006

(30) Foreign Application Priority Data

Sep. 28, 2004 (JP) ............................. 2004-282269

(51) Int. Cl.
*G01N 15/06* (2006.01)
*G01N 21/49* (2006.01)
*G01N 21/85* (2006.01)

(52) U.S. Cl. ................... 250/573; 250/574; 250/575; 340/602

(58) Field of Classification Search ......... 250/573–575; 340/602
See application file for complete search history.

(56) References Cited

U.S. PATENT DOCUMENTS

| 5,391,891 | A | * | 2/1995 | Wiegleb et al. ............. 250/574 |
| 5,543,923 | A | * | 8/1996 | Levers et al. ................ 356/445 |
| 5,560,245 | A | * | 10/1996 | Zettler et al. ............. 73/335.01 |
| 5,661,303 | A | * | 8/1997 | Teder ....................... 250/341.8 |
| 5,898,183 | A | | 4/1999 | Teder |
| 6,507,015 | B1 | | 1/2003 | Maeno et al. |
| 6,744,371 | B1 | | 6/2004 | Schmitt et al. |
| 6,831,288 | B1 | | 12/2004 | Schmitt et al. |
| 2003/0160158 | A1 | * | 8/2003 | Ishino et al. ........... 250/227.25 |
| 2004/0080275 | A1 | * | 4/2004 | Schmitt et al. ............... 315/159 |

FOREIGN PATENT DOCUMENTS

DE 19830120 A1 * 2/1999

OTHER PUBLICATIONS

Japanese Official Action, mailed Jun. 24, 2008, issued in corresponding Japanese Appln. No. 2004-282269, with English translation.

* cited by examiner

*Primary Examiner*—Seung C Sohn
(74) *Attorney, Agent, or Firm*—Nixon & Vanderhye PC

(57) ABSTRACT

A raindrop detection apparatus includes a light emitting unit for emitting light to an inner side of a windshield, a light receiving unit for receiving the light reflected by an outer surface of the windshield, a first lens unit which is arranged between the windshield and the light emitting unit to convert the light from the light emitting unit into parallel light, and a second lens unit which is arranged between the windshield and the light receiving unit to converge the reflected light at the light receiving unit. The second lens unit is larger than a radial cross section of the reflected light. An amount of raindrop landed on the outer surface of the windshield is detected based on an intensity of the light received by the light receiving unit.

13 Claims, 4 Drawing Sheets

RAINDROP DETECTION APPARATUS HAVING LENS UNIT LARGER THAN RADIUS OF REFLECTED LIGHT

CROSS REFERENCE TO RELATED APPLICATION

This application is based on a Japanese Patent Application No. 2004-282269 filed on Sep. 28, 2004, the disclosure of which is incorporated herein by reference.

FIELD OF THE INVENTION

The present invention relates to a raindrop detection apparatus. The raindrop detection apparatus is suitably used in a wiper control device for a vehicle, for example.

BACKGROUND OF THE INVENTION

Generally, a raindrop detection apparatus is provided in a wiper control device for a vehicle to detect raindrop landed on a windshield of the vehicle, for example, referring to JP-A-2001-521158 (U.S. Pat. No. 5,898,183) and JP-A-2001-66246 (U.S. Pat. No. 6,507,015).

The raindrop detection apparatus has a first lens unit that converts light from a light emitting unit into parallel light, a light conducting unit that conducts the parallel light to the windshield and conducts light reflected by an outer surface of the windshield, and a second lens unit that converges reflection light at a light receiving unit.

In this case, light from the light emitting unit passes through the interior of the windshield and is reflected at the outer surface of the windshield, then received by the light receiving unit. The raindrop detection apparatus is designed according to the thickness of the windshield on which the first lens unit, the second lens unit, and the light conducting unit are mounted, so that the light receiving unit can properly receive the light from the light emitting unit.

Recently, the wiper control device is provided for not only a large-sized vehicle but also a small-sized vehicle, to improve a traveling safety even in a rainy weather. Generally, the thickness of the windshield differs according to the vehicle types. For example, the small-sized vehicle has a thinner windshield than the large-sized vehicle. Thus, the raindrop detection apparatus is to be designed responding to the thickness of the windshield, at which the first lens unit, the second lens unit, and the light conducting unit are mounted. Therefore, the manufacturing cost is increased.

Moreover, referring to JP-A-2001-66246, the raindrop detection apparatus is provided with the first lens unit (at side of light emitting unit) that includes multiple small-diameter lenses with a gap arranged therebetween. The first lens unit has a shape and a construction significantly different from those of the second lens unit (at side of light receiving unit), thus making the optical axis design complex. Furthermore, in this case, light emitted to the gap is not used (not received by light receiving unit) to be wasted.

SUMMARY OF THE INVENTION

In view of the above-described disadvantage, it is an object of the present invention to provide a raindrop detection apparatus which can be suitably used for windshields having different thicknesses.

According to the present invention, a raindrop detection apparatus includes at least one light emitting unit for emitting light to an inner side of a windshield, a light receiving unit for receiving the light reflected by an outer surface of the windshield, a first lens unit which is arranged between the windshield and the light emitting unit to convert the light from the light emitting unit into parallel light, and a second lens unit which is arranged between the windshield and the light receiving unit to converge the reflected light at the light receiving unit. The second lens unit is larger than a radial cross section of the reflected light. An amount of raindrop landed on the outer surface of the windshield is detected based on an intensity of the light received by the light receiving unit.

Because the second lens unit is larger than the radial cross section of the reflected light, a major part of the light reflected by the windshield can be converged at the light receiving unit, even when the reflected light offsets from a central axis of the second lens unit due to a thickness difference of the windshield where the raindrop detection apparatus is to be mounted. Accordingly, the raindrop detection apparatus can be suitably used for the windshields having different thicknesses. However, in the related art, the second lens unit is formed to be substantially same in size with the radial cross section of the reflected light. In this case, when the reflected light offsets from the central axis of the second lens unit due to the thickness difference of the windshield, a part of the reflected light will fail to be converged at the light receiving unit.

Preferably, each of the first lens unit and the second lens unit is made of one of polycarbonate, polymethyl methacrylate, acrylic resin and polyester.

Generally, the raindrop detection apparatus is mounted at a position exposed to sunshine, so that the lens units may be deformed due to heat. According to the present invention, even when the first lens unit and the second lens unit are thermally deformed, a major part of the rejected light can be converged at the light receiving unit. Because polycarbonate and the like are cheap, the manufacture cost of the raindrop detection apparatus can be reduced.

More preferably, the first lens unit is divided into two parts by a first virtual plane, which extends along a central axis of the first lens unit and intersects the windshield at a substantially same angle with that between the central axis and the windshield. The two parts are arranged to offset from each other so that distances from the light emitting unit to the two parts become different and a difference between perpendicular heights of the two parts with respect to the windshield becomes small. The second lens unit is divided into two parts by a second virtual plane, which extends along a central axis of the second lens unit and intersects the windshield at a substantially same angle with that between the central axis and the windshield. The two parts are arranged to offset from each other so that distances from the light receiving unit to the two parts become different and a difference between perpendicular heights of the two parts with respect to the windshield becomes small.

Because the difference between the perpendicular heights of the two parts of the lens unit with respect to the windshield is decreased, the perpendicular overall height of the lens unit with respect to the windshield can be decreased as compared with the case where the lens unit is constructed of the single lens.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENT

First Embodiment

Figure 1:
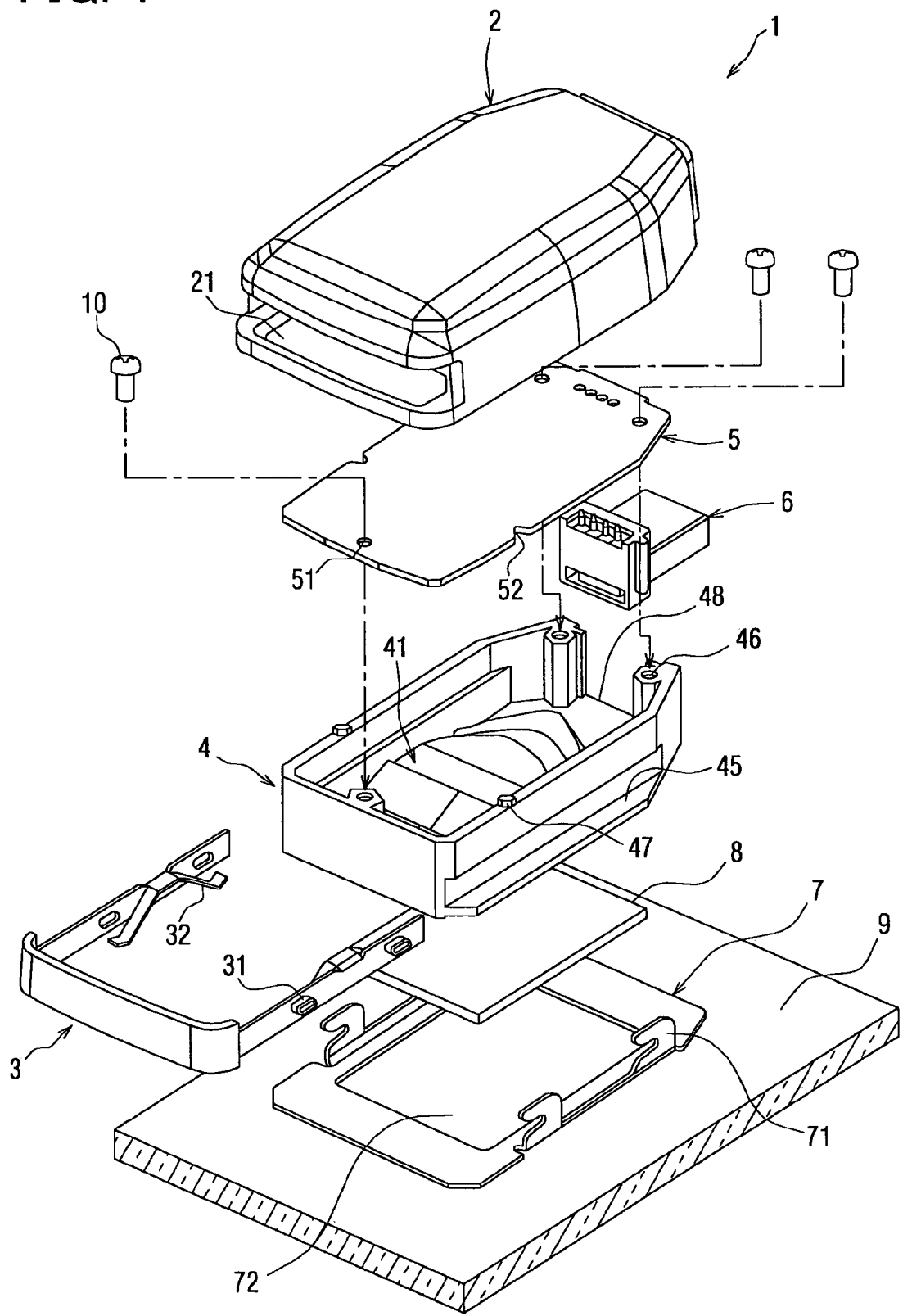
FIG. 1 is a disassembled perspective view showing a raindrop detection apparatus according to a first embodiment of the present invention.

A raindrop detection apparatus 1 according to a first embodiment of the present invention is suitably used to detect an amount of raindrop landed on an outer surface of a window glass 9 (e.g., windshield) of a vehicle, for example. The raindrop detection apparatus 1 is attached to an inner surface of the windshield 9 without obstructing the sight (field of view) of a driver. Referring to FIG. 1, the raindrop detection apparatus 1 is provided with a cover 2, a case unit 4, a prism 41, a circuit board 5, a connector 6, a stopper 3, a silicon sheet 8, a bracket 7 and the like. The case unit 4 is integrated with the prism 41.

The bracket 7 is beforehand fixed (for example, by bonding) to the windshield 9 at the position where the raindrop detection apparatus 1 is to be mounted. As shown in FIG. 1, the bracket 7 has multiple (e.g., four) engagement hook portions 71 which are evenly arranged at two opposite sides of the bracket 7. The bracket 7 has an opening 72 at a substantial center portion thereof. The bracket 7 can be formed by pressing a metal sheet, for example.

The silicon sheet 8 is arranged in the opening 72 of the bracket 7 fixed to the windshield 9. The prism 41 is mounted on an opposite surface of the silicon sheet 8 to the windshield 9, in a manner to be pushed against the windshield 9. That is, the silicon sheet 8 which is resilient to some extent is positioned between the prism 41 and the windshield 9, to restrict a formation of an air layer therebetween. The silicon sheet 8 has a substantially same refractive index with the prism 41 and the windshield 9, so that light passing through the prism 41 can straight advance to the outer surface of the windshield 9 without being refracted at interfaces between the silicon sheet 8 and the prism 41 (or windshield 9).

The case unit 4, being integrated with the prism 41, is made of a resin having an optical transparency such as polycarbonate, polymethyl methacrylate, acrylic resin, polyester and the like. As shown in FIG. 1, the prism 41 can be integrally formed on a lower surface of the case unit 4, and the upper side of the case unit 4 is opening. The case unit 4 has a fence wall surrounding an inner space therein. The fence wall has a recess portion 48 where the connector 6 is mounted. The case unit 4 is provided with two flange portions 45 which respectively protrude outward from two opposite outer surfaces of the fence wall of the case unit 4.

The case unit 4 has multiple (e.g., three) threaded holes 46 for a fixation of the circuit board 5. The threaded holes 46 can be formed at an inner side of the fence wall of the case unit 4.

Referring to FIG. 1, multiple (e.g., two) protrusion portions 47 for positioning the circuit board 5 are formed at an upper surface (at opposite side to silicon sheet 8) of the fence wall of the case unit 4.

Figure 2:
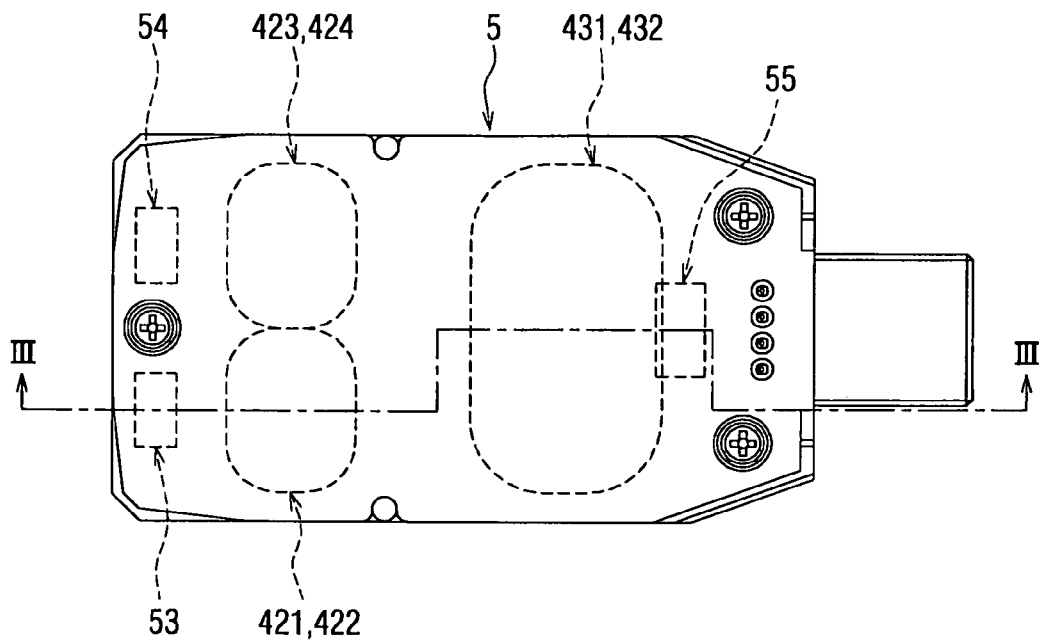
FIG. 2 is a plan view showing a state of a case unit to which a circuit board and a connector of the raindrop detection apparatus are attached according to the first embodiment.
Figure 3:
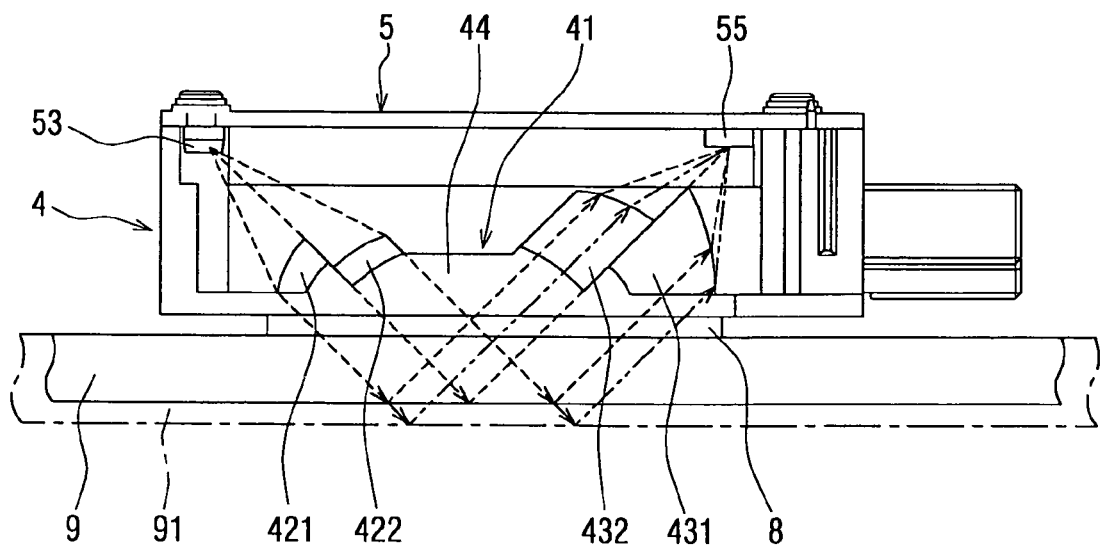
FIG. 3 is a cross-sectional view of the case unit taken along a line III-III in FIG. 2.

Referring to FIGS. 2 and 3, the raindrop detection apparatus is further provided with light emitting units 53 and 54 (e.g., light emitting diodes), a light receiving unit 55 (e.g., photo diode) and a signal processing circuit (not shown), which are mounted on a surface (at side of windshield 9) of the circuit board 5. The light emitting diodes (LED) 53 and 54 radiate light toward the prism 41. The photo diode (PD) 55 receives light from the prism 41. The connector 6 is attached to the circuit board 5, to electrically connect the PD 55, the signal processing circuit, the LED 53 and 54 with the external.

The circuit board 5 is provided with multiple (e.g., three) penetration holes 51 which are respectively positioned corresponding to the threaded holes 46, and multiple (e.g., two) concave portions 52 which are respectively positioned corresponding to the protrusion portions 47 when the circuit board 5 covers the upper surface of the case unit 4. The concave portions 52 are engaged with the protrusion portions 47, to position the circuit board 5 with respect to the case unit 4.

Multiple (e.g., three) screws 10 are inserted through the penetration holes 51 and screwed into the threaded holes 46, so that the circuit board 5 is fixed to the case unit 4. Thus, referring to FIG. 1, the upper side (being opposite side to windshield 9) of the case unit 4 and the recess portion 48 thereof are respectively closed (obstructed) by the circuit board 5 and the connector 6. That is, the inner space of the case unit 4 is closed.

Thus, the prism 41 arranged in the case unit 4 does not contact an outside air, so that dew condensation can be restricted from occurring on the surface of the prism 41. Accordingly, it is possible to omit a heater device, which is provided in a raindrop detection apparatus according to the related art. Therefore, the raindrop detection apparatus 1 according to the present invention can be small-sized.

The cover 2 is provided at the outer side the case unit 4 where the circuit board 5 is fixed, to construct a part of the outer wall of the raindrop detection apparatus 1. An opening 21, through which the stopper 3 is to be inserted, is formed on a side wall of the cover 2, as shown in FIG. 1.

The stopper 3 includes an outer wall portion that constructs a part of the outer wall of the raindrop detection apparatus 1 together with the cover 2, and an insertion portion which is inserted into the opening 21. The insertion portion is provided with multiple protuberances 31 and multiple springs 32. Each of the protuberances 31 is engaged with both an inner surface of the cover 2 and the engagement hook portion 71 of the bracket 7. Each of the springs 32 pushes the flange portion 45 of the case unit 4 against the windshield 9.

The cover 2 is fixed to the bracket 7 by inserting the stopper 3 into the opening 21 of the cover 2 in which the case unit 4 and the circuit board 5 fixed thereto are accommodated, and by engaging the protuberances 31 of the stopper 3 with the engagement hook portions 71 of the bracket 7. In this case, a pushing force toward the windshield 9 is exerted on the case unit 4 by the stopper 3 (springs 32), which is fixed to the bracket 7.

Next, the prism 41 which is integrated with the case unit 4 will be described.

The prism 41 is made of a resin having the same optical transparency with the case unit 4. As shown in FIGS. 2 and 3, the prism 41 includes two first lens units, a light conducting unit 44, and a second lens unit including outgoing-side divided lenses 431 and 432. The one first lens unit includes incoming-side divided lenses 421 and 422. The other first lens unit includes incoming-side divided lenses 423 and 424.

The PD 55, the LED 53 and the LED 54 are attached to the circuit board 5. The LED 53 radiates light to the incoming-side divided lenses 421 and 422. The LED 54 radiates light to the incoming-side divided lenses 423 and 424. The PD 55 receives light from the outgoing-side divided lenses 431 and 432.

The LED 54 and the LED 53 can be formed to have the same construction, and symmetrically arranged with respect to the central line of the circuit board 5, for example. Similarly, the two first lens units can be formed to have the same construction, and symmetrically arranged with respect to the central line of the circuit board 5, for example. The position relation between the LED 54 and the incoming-side divided lens 423, 424 can be set same with that between the LED 53 and the incoming-side divided lens 421, 422, which are exampled in the following.

The incoming-side divided lens 421, 422 functions to convert light incident from the LED 53 into parallel light. The LED 53 is arranged at a predetermined position on the mounting surface of the circuit board 5. The light conducting unit 44 conducts the parallel light from the incoming-side divided lenses 421 and 422 to the outer surface of the windshield 9 without having the light reflected and refracted at the inner surface of the windshield 9, and conducts reflection light reflected by the outer surface to the outgoing-side divided lenses 431 and 432. The outgoing-side divided lenses 431 and 432 converge the reflection light, which passes through the light conducting unit 44, at the PD 55.

As shown in FIG. 3, the incoming-side divided lenses 421 and 422 are constructed of two parts of a single convex lens which is divided into the two parts by a virtual plane (first virtual plane). The virtual plane extends along a central axis of the convex lens, and intersects the windshield 9 at the substantially same angle with that between the central axis and the windshield 9. The two parts (divided lenses 421 and 422) are arranged to offset from each other with maintaining divided surfaces (surfaces facing each other) of the divided lenses 421 and 422 in the first virtual plane, so that distances from a light source of the LED 53 to lens surfaces of the divided lenses 421 and 422 become different and a difference between perpendicular heights of the divided lenses 421 and 422 with respect to the windshield 9 becomes small. That is, the two parts (divided lenses 421 and 422) of the single convex lens offset from each other along the first virtual plane, and the divided surfaces of the two parts contact each other.

According to this embodiment, the incoming-side divided lenses 421 and 422 are constructed of the two parts of the single lens, and the incoming-side divided lenses 421 and 422 are arranged to decrease the difference between the perpendicular heights of the incoming-side divided lenses 421 and 422 with respect to the windshield 9. Therefore, the perpendicular overall height of the incoming-side divided lenses 421 and 422 with respect to the windshield 9 can be decreased, as compared with the case where the incoming-side divided lenses 421 and 422 are constructed of the single lens.

The surfaces of the incoming-side divided lenses 421 and 422 are shaped so that focal points of the incoming-side divided lenses 421 and 422 accord with the light source of the LED 53. Thus, incident light from the LED 53 can be converted into the parallel light even when the single convex lens is divided into the incoming-side divided lenses 421 and 422.

The outgoing-side divided lenses 431 and 432 are constructed of two parts of a single convex lens which is divided into the two parts by a virtual plane (second virtual plane). The virtual plane extends along a central axis of the convex lens, and intersects the windshield 9 at the substantially same angle with that between the central axis and the windshield 9. The two parts (divided lenses 431 and 432) are arranged to offset from each other with maintaining divided surfaces (surfaces facing each other) of the two parts in the second virtual plane, so that distances from a light source of the PD 55 to lens surfaces of the divided lenses 431 and 432 become different and a difference between perpendicular heights of the divided lenses 431 and 432 with respect to the windshield 9 becomes small. That is, the two parts (divided lenses 431 and 432) of the single convex lens offset from each other along the second virtual plane, and the divided surfaces of the two parts contact each other.

According to this embodiment, the outgoing-side divided lenses 431 and 432 are constructed of the two parts of the single lens, and the outgoing-side divided lenses 431 and 432 are arranged to decrease the difference between the perpendicular heights of the outgoing-side divided lenses 431 and 432 with respect to the windshield 9. Therefore, the perpendicular overall height of the outgoing-side divided lenses 431 and 432 with respect to the windshield 9 can be decreased, as compared with the case where the outgoing-side divided lenses 431 and 432 are constructed of the single lens.

The surfaces of the outgoing-side divided lenses 431 and 432 are shaped so that focal points of the outgoing-side divided lenses 431 and 432 accord with the light reception point of the PD 55. Therefore, light can be converged at the PD 55, even when the single convex lens is divided into the outgoing-side divided lenses 431 and 432.

According to this embodiment, the prism 41 is constructed of the incoming-side divided lenses 421, 422, 423, 424 and the outgoing-side divided lenses 431, 432, as described above. Therefore, a perpendicular height (overall height) of the prism 41 with respect to the windshield 9 can be decreased, as compared with a prism constructed of divided lenses which are joined into a single lens corresponding to respective shapes.

The second lens unit (including outgoing-side divided lenses 431 and 432) is formed on the light conducting unit 44, through which reflection light passes. As shown in FIGS. 2 and 3, each of the second lens unit and the light conducting unit 44 is larger than radial cross sections of reflection light which is formed by reflecting (by windshield 9) parallel light from the incoming-side divided lenses 421 and 422 and reflection light which is formed by reflecting (by windshield 9) parallel light from the incoming-side divided lenses 423 and 424.

Next, the operation of the raindrop detection apparatus 1 according to this embodiment will be described.

When light having a predetermined directivity is incident on the incoming-side divided lenses 421 and 422 from the LED 53, the incoming-side divided lenses 421 and 422 converts the light into parallel light (indicated by dashed lines in FIG. 3). The parallel light is incident at a predetermined angle on the light conducting unit 44, and advances through the silicon sheet 8 to the inner surface of the windshield 9. The silicon sheet 8 is arranged at the lower side of the light conducting unit 44.

The light conducting unit 44, the silicon sheet 8 and the windshield 9 are provided with the substantially same refractive indexes. Thus, the incident parallel light can straight advance to the outer surface of the windshield 9 without being refracted at the interfaces between the light conducting unit 44, the silicon sheet 8 and the windshield 9, though being reflected at the interfaces to some extent.

The parallel light from the incoming-side divided lenses 421 and 422 is reflected at a predetermined reflection coefficient at the interface (outer surface of windshield 9) between the windshield 9 and outside air, to become reflection light. The reflection coefficient at the interface will decrease when raindrop, water droplets or the like adheres to the outer surface of the windshield 9, as compared with that in a fine weather. When the reflection coefficient becomes small, the quantity of reflection light reflected at the interface will be decreased.

The reflection light will advance in the light conducting unit 44 toward the outgoing-side divided lenses 431 and 432. Thus, the reflection light incident on the outgoing-side divided lenses 431 and 432 is converged at the PD 55. In this case, output voltage corresponding to the quantity of the reflection light converged at the PD 55 is generated in the PD 55 and sent to the signal processing circuit.

The signal processing circuit calculates a reduction rate of the current output voltage by a comparison with an output voltage (which is beforehand stored) of a fine weather. Then, an amount of raindrop adhering to (landed on) the windshield 9 can be calculated on the basis of the reduction rate by the signal processing circuit.

Alternatively, the amount of raindrop can be calculated by making a comparison between a plurality of predetermined judgment values and the current output voltage (or reduction rate). Further alternatively, the amount of raindrop can be directly calculated from the current output voltage or the reduction rate.

Next, the effect of the present invention will be described.

Figure 4:
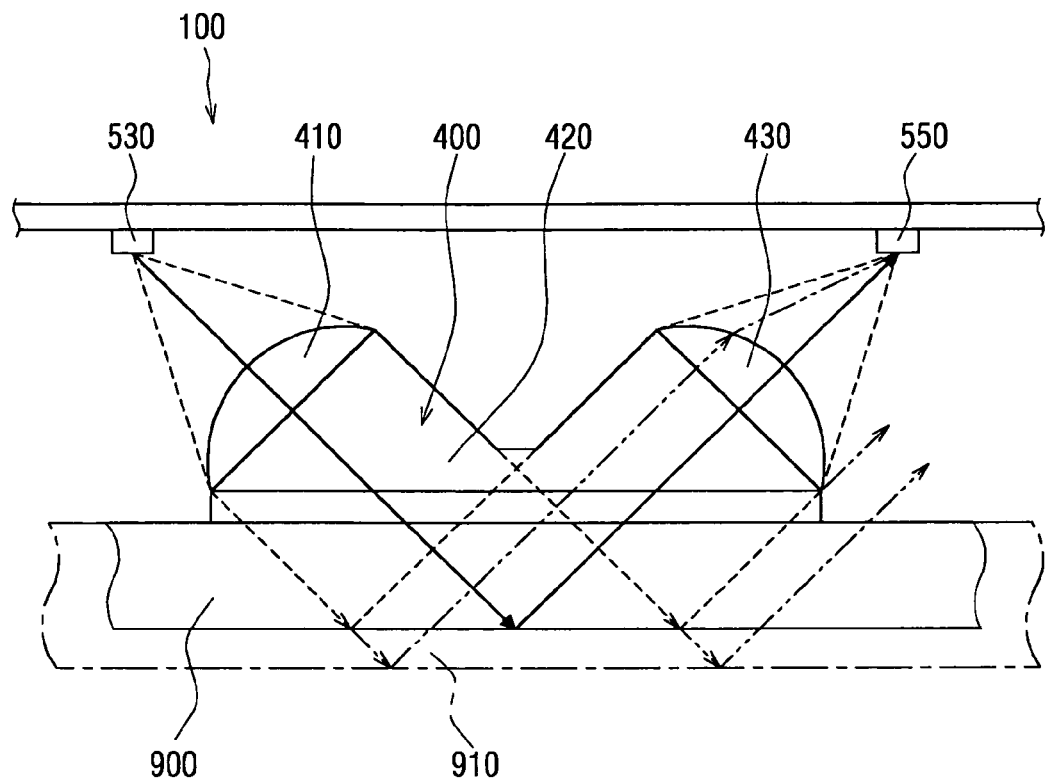
FIG. 4 is a cross-sectional view showing a raindrop detection apparatus according to a comparison example.

At first, as a comparison with the raindrop detection apparatus 1 described in the present invention, a raindrop detection apparatus 100 according to a related art is described referring to FIG. 4.

In the raindrop detection apparatus 100, a prism 400 including an incoming-side lens 410 for receiving light from light emitting unit 530, an outgoing-side lens 430 and a light conducting unit 420 is designed according to a thickness of a windshield 900 (indicated by solid line in FIG. 4). In this case, the outgoing-side lens 430 has the substantially same size with a radial cross section of reflection light (indicated by broken lines) reflected at an outer surface of the windshield 900.

If the prism 400 designed according to the thickness of the windshield 900 is attached to a windshield 910 (indicated by one-point chain line in FIG. 4) having a thickness different from that of the windshield 900, the following problem may be caused.

For example, in the case where the windshield 910 has a larger thickness than the windshield 900, the reflection position of parallel light will offset toward the side of a PD 550 corresponding to the thickness increment (compared with windshield 900) of the windshield 910. Therefore, reflection light (indicated by two-point chain line) reflected at an outer surface of the windshield 910 will offset on the whole toward the PD 550 from a central axis of the outgoing-side lens 430.

Accordingly, a part of the reflection light is not incident on the outgoing-side lens 430, and not converged at the PD 550. Thus, the calculated reduction rate of the current output voltage will become large. For example, a fine weather may be falsely determined to be a rain weather due to the calculated reduction ratio which is increased. Thus, an error in the raindrop detection by the raindrop detection apparatus 100 may be caused.

According to this embodiment of the present invention, referring to FIG. 3, the outgoing-side divided lens 431, 432 and the light conducting unit 44, through which reflection light passes, are formed to be larger than the radial cross sections of the reflection light which is formed by reflecting (by windshield 9) the parallel light from the incoming-side divided lenses 421 and 422 and the reflection light which is formed by reflecting (by windshield 9) the parallel light from the incoming-side divided lenses 423 and 424.

When the raindrop detection apparatus 1 is attached to the windshield 91 (indicated by one-point chain line) having a different thickness from that of the windshield 9, reflection light (indicated by two-point chain line) offsets toward the PD 55 from the central axis of the outgoing-side divided lens 431, 432. According to this embodiment of the present invention, a major part of the reflection light can be incident on the outgoing-side divided lens 431, 432 to be converged at the PD 550. Therefore, the error in the raindrop detection is reduced. Accordingly, the raindrop detection apparatus 1, in which the prism 41 is not designed based on the thickness of the windshield, can be mounted at the windshields having different thicknesses.

Figure 5:
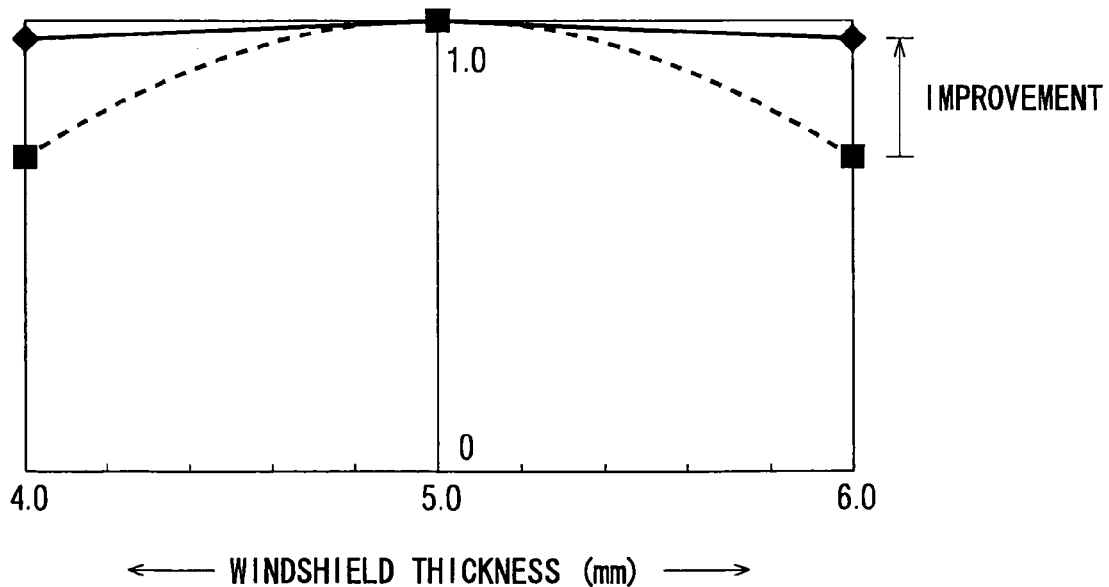
FIG. 5 is a graph showing a relation between a light quantity ratio of a PD and a thickness of a windshield to which the raindrop detection apparatus is attached.

FIG. 5 shows a relation (indicated by solid line) between a light quantity ratio of a PD and a thickness of a windshield, to which the raindrop detection apparatus 1 of the present invention is attached, and a relation (indicated by broken line) between a light quantity ratio of a PD and a thickness of a windshield, to which the raindrop detection apparatus 100 of the comparison example is attached.

As shown in FIG. 5, the abscissa axis indicates the thickness of the windshield, and the ordinate axis indicates the light quantity ratio of the PD. The light quantity ratio is a ratio of reflection light received by the PD to reflection light reflected by the windshield. When the PD receives all of the reflection light reflected by the windshield, the light quantity ratio becomes 1. As described above, in the raindrop detection apparatus 100, a part of the reflection light fails to be converged at the PD so that the light quantity ratio will become small. In FIG. 5, the thickness of the windshield ranges from 4 mm to 6 mm, considering the thickness of the windshield mounted on general large-sized and small-sized vehicles.

In the raindrop detection apparatus 1 according to this embodiment, a major part of the reflection light can be converged at the PD 55 even when being attached to the windshield 91 having the different thickness. Therefore, as shown in FIG. 5, the light quantity ratio of the raindrop detection apparatus 1 is maintained in the neighborhood of 1 responding to the different windshield thicknesses. However, the light quantity ratio of the raindrop detection apparatus 100 of the comparative example is lowered except for a certain range of the windshield thickness. The improvement of the light quantity ratio of the PD by the raindrop detection apparatus 1 is shown in FIG. 5.

Moreover, according to the related art, a raindrop detection apparatus (prism) is constructed of a material having a low thermal strength, thus being easily thermally deformed in a high-temperature environment (for example, in exposure of sunshine or in summer). Therefore, a similar phenomenon to the offset of the reflection light due to the difference of the windshields thickness is generated. As a result, a part of reflection light fails to be received by the PD, thus causing an error in the raindrop detection.

In contrast, the problem is solved in the related art by providing a raindrop detection apparatus (prism) constructed of a material having a high thermal strength, for example, cycloolefin polymer, annulate olefin copolymer and norbornene resin. However, these materials are relatively expensive so that the manufacture cost is heightened.

According to the first embodiment of the present invention, the prism 41 is constructed of a material having a low thermal strength. As described above, even when the prism 41 is thermally deformed due to the direct sunshine or the like, the offset of the reflection light can be compensated because a major part of the reflection light is converged at the PD 55. Therefore, the manufacture cost of the raindrop detection apparatus 1 can be reduced, as compared with the raindrop detection apparatus according to the related art.

Moreover, according to the first embodiment, the prism 41 and the case unit 4 are integrated with each other. Therefore, a deformation (such as warpage) of the prism 41 due to heat or the like can be restricted by a reinforcement of the case unit 4. Therefore, the strength of the prism 41 against the thermal deformation is improved.

Furthermore, the circuit board 5 shown in FIG. 1 is fixed to the case unit 4 by the screws 10. Therefore, the LED 53, 54 and the PD 55 (which are mounted on circuit board 5) can be easily positioned with respect to the incoming-side divided lenses 421, 422, 423, 424 and the outgoing-side divided lenses 431, 432, which are formed in the prism 41.

Second Embodiment

A second embodiment of the present invention is described with reference to FIG. 6. The second embodiment is a modification of the above-described first embodiment.

Figure 6:
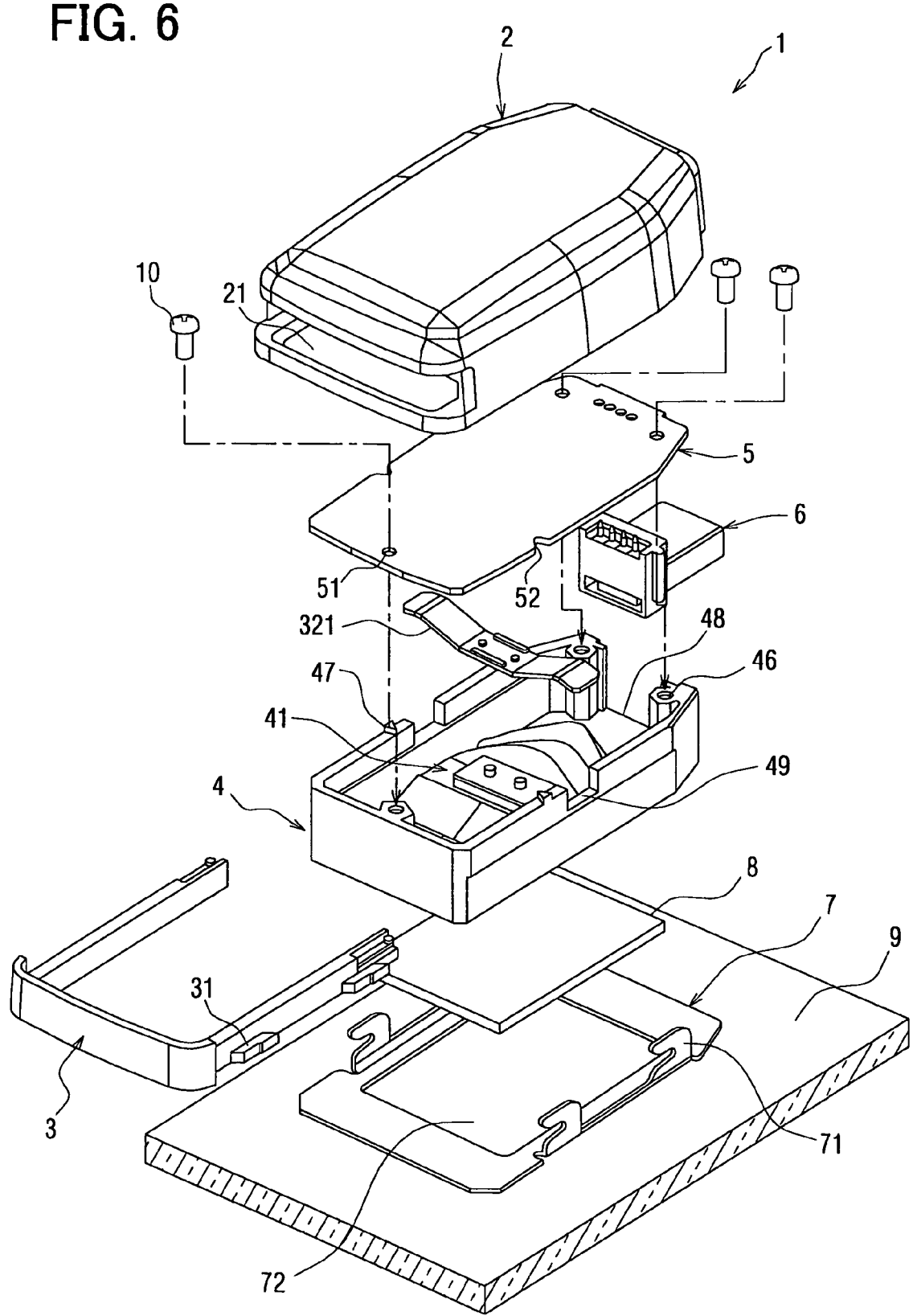
FIG. 6 is a disassembled perspective view showing a raindrop detection apparatus according to a second embodiment of the present invention.

Referring to FIG. 6, two recess portions 49 for accommodating a spring 321 are respectively formed at two opposite sides of the fence wall of the case unit 4. The spring 321 can be constructed of, for example, a steel sheet and bent to have a shape shown in FIG. 6. The spring 321 pushes the prism 41 toward the windshield 9 at a substantially central portion of the prism 41. In this embodiment, the single spring 321 is used instead of the two springs 32, which are provided for the stopper 3 as described in the first embodiment.

According to the second embodiment, two longitudinal-direction ends of the spring 321 are positioned at the outer side of the case unit 4 when being attached to the prism 41. Thus, when the raindrop detection apparatus 1 is mounted at the windshield 9, the two ends of the spring 321 are pushed against the inner surface of the cover 2. Therefore, the prism 41 can be pushed against the windshield 9.

In this case, the recess portions 49 are formed at the case unit 4, so that the closing performance of the case unit 4 is lowered as compared with that of the raindrop detection apparatus 1 described in the first embodiment. However, because the case unit 4 is surrounded with the cover 2 and the stopper 3, it is possible to maintain the closing performance to such an extent that dew condensation is not generated on the surface of the prism 41. Accordingly, a heater device for preventing the dew condensation can be omitted.

What is claimed is:

1. A raindrop detection apparatus comprising:
at least one light emitting unit for emitting light toward an inner side of a windshield;
a light receiving unit for receiving the light reflected by an outer surface of the windshield;
at least one first lens unit which is arranged between the windshield and the light emitting unit to convert the light from the light emitting unit into parallel light; and
a second lens unit which is arranged between the windshield and the light receiving unit to converge the reflected light at the light receiving unit, wherein:
the second lens unit is larger than a radial cross section of the reflected light, a surface of the second lens unit disposed for passing the reflected light has a larger area than a surface of the at least one first lens unit through which the light from the light emitting unit passes, and a thickness of the second lens unit in a direction perpendicular to the outer surface of the windshield is larger than a thickness of the first lens unit in a direction perpendicular to the outer surface of the windshield; and
an amount of raindrop landed on the outer surface of the windshield is detected based on an intensity of the light received by the light receiving unit.

2. The raindrop detection apparatus according to claim 1, further comprising
a light conducting unit arranged between an inner surface of the windshield, and the first and second lens units, the light conducting unit conducting the parallel light to the windshield and conducting the reflected light to the second lens unit.

3. The raindrop detection apparatus according to claim 2, further comprising
a case unit, in which the first lens unit, the second lens unit and the light conducting unit are accommodated, wherein
the case unit, the first lens unit, the second lens unit and the light conducting unit are constructed integrally.

4. The raindrop detection apparatus according to claim 3, further comprising
a circuit board, at which the light emitting unit and the light receiving unit are mounted, the circuit board being supported by the case unit.

5. The raindrop detection apparatus according to claim 4, further comprising
a connector for electrically connecting the circuit board with an external circuit, wherein
the first lens unit and the second lens unit are surrounded by the case unit, the circuit board, and the connector to be in a substantially closed state, and
the connector is connected to the circuit board and is engaged with the case.

6. The raindrop detection apparatus according to claim 2, further comprising
a silicon sheet arranged between the light conducting unit and the inner surface of the windshield.

7. The raindrop detection apparatus according to claim 1, wherein each of the first lens unit and the second lens unit is made of one of polycarbonate, polymethyl methacrylate, acrylic resin and polyester.

8. The raindrop detection apparatus according to claim 1, wherein:
the first lens unit is divided into two parts by a first virtual plane, which extends along a central axis of the first lens unit and intersects the windshield at a substantially same angle with that between the central axis and the windshield, the two parts being arranged to offset from each other so that distances from the light emitting unit to the two parts become different and a difference between perpendicular heights of the two parts with respect to the windshield becomes small; and
the second lens unit is divided into two parts by a second virtual plane, which extends along a central axis of the second lens unit and intersects the windshield at a substantially same angle with that between the central axis and the windshield, the two parts being arranged to offset from each other so that distances from the light receiving unit to the two parts become different and a difference between perpendicular heights of the two parts with respect to the windshield becomes small.

9. The raindrop detection apparatus according to claim 8, wherein:

the two parts of the first lens unit offset from each other along the first virtual plane, and divided surfaces of the two parts are arranged to contact each other; and the two parts of the second lens unit offset from each other along the second virtual plane, and divided surfaces of the two parts are arranged to contact each other.

10. A raindrop detection apparatus comprising:

at least one light emitting unit for emitting light toward an inner side of a windshield;

a light receiving unit for receiving the light reflected by an outer surface of the windshield;

at least one first lens unit which is arranged between the windshield and the light emitting unit to convert the light from the light emitting unit into parallel light; and a second lens unit which is arranged between the windshield and the light receiving unit to converge the reflected light at the light receiving unit, wherein:

the second lens unit is larger than a radial cross section of the reflected light, a surface of the second lens unit disposed for passing the reflected light has a larger area than a surface of the at least one first lens unit through which the light from the light emitting unit passes, and a thickness of the second lens unit in a direction perpendicular to the outer surface of the windshield is larger than a thickness of the first lens unit in a direction perpendicular to the outer surface of the windshield, and an amount of raindrop landed on the outer surface of the windshield is detected based on an intensity of the light received by the light receiving unit, further comprising:

a light conducting unit arranged between an inner surface of the windshield, and the first and second lens units, the light conducting unit conducting the parallel light to the windshield and conducting the reflected light to the second lens unit; and a case unit, in which the first lens unit, the second lens unit and the light conducting unit are accommodated, wherein:

the case unit, the first lens unit, the second lens unit and the light conducting unit are constructed integrally, and the case unit, the first lens unit, the second lens unit and the light conducting unit are constructed by a same material and integrated with each other by molding, and further comprising:

a circuit board, at which the light emitting unit and the light receiving unit are mounted, the circuit board being supported by the case unit, and a connector for electrically connecting the circuit board with an external circuit, wherein the connector and the circuit board form a first sealing for the first lens unit and the second lens unit, and a cover is provided at an outer side of the case unit where the circuit board is fixed, the cover and the case unit forming a second sealing for the first lens unit and the second lens unit.

11. A raindrop detection apparatus comprising:

at least one light emitting unit for emitting light toward an inner side of a windshield;

a light receiving unit for receiving the light reflected by an outer surface of the windshield;

at least one first lens unit which is arranged between the windshield and the light emitting unit to convert the light from the light emitting unit into parallel light; and a second lens unit which is arranged between the windshield and the light receiving unit to converge the reflected light at the light receiving unit, wherein:

a convergence surface of the second lens unit has a larger area than a conversion surface of the at least one first lens unit, the light from the light emitting unit passing through the conversion surface of the at least one first lens unit to be converted into the parallel light, the reflected light passing through the convergence surface of the second lens unit to be converged;

a thickness of the second lens unit in a direction perpendicular to the outer surface of the windshield is larger than a thickness of the first lens unit in a direction perpendicular to the outer surface of the windshield; and an amount of raindrop landed on the outer surface of the windshield is detected based on an intensity of the light received by the light receiving unit.

12. A raindrop detection apparatus comprising:

at least one light emitting unit for emitting light toward an inner side of a windshield;

a light receiving unit for receiving the light reflected by an outer surface of the windshield;

at least one first lens unit which is arranged between the windshield and the light emitting unit to convert the light from the light emitting unit into parallel light;

a second lens unit which is arranged between the windshield and the light receiving unit to converge the reflected light at the light receiving unit;

a case unit, in which the first lens unit and the second lens unit are accommodated, and further comprising:

a circuit board, at which the light emitting unit and the light receiving unit are mounted, the circuit board being supported by the case unit, a connector for electrically connecting the circuit board with an external circuit, wherein the connector and the circuit board form a first sealing for the first lens unit and the second lens unit, and a cover is provided on an outer side of the case unit where the circuit board is fixed, the cover and the case unit forming a second sealing for the first lens unit and the second lens unit, and wherein:

the case unit, the first lens unit and the second lens unit are made of a same material and molded integrally with each other to have a one-piece construction; and an amount of raindrop landed on the outer surface of the windshield is detected based on an intensity of the light received by the light receiving unit.

13. The raindrop detection apparatus according to claim 12, further comprising a light conducting unit arranged between an inner surface of the windshield, and the first and second lens units, the light conducting unit conducting the parallel light to the windshield and conducting the reflected light to the second lens unit, wherein the case unit, the first lens unit, the second lens unit and the light conducting unit are made of the same material and molded integrally with each other to have the one-piece construction.

* * * * *